United States Patent [19]

Imura et al.

[11] 3,829,873
[45] Aug. 13, 1974

[54] SINGLE LENS REFLEX CAMERA PROVIDED WITH A SHUTTER CONTROLLED ELECTRICALLY

[75] Inventors: Toshinori Imura; Akira Yamanaka, both of Osaka, Japan

[73] Assignee: Minolta Camera Kabushiki Kaisha, Osaka-shi, Osaka-fu, Japan

[22] Filed: June 27, 1973

[21] Appl. No.: 374,169

[30] Foreign Application Priority Data
July 1, 1972   Japan.............................. 47-65441
Aug. 12, 1972  Japan.............................. 47-94213

[52] U.S. Cl. ............................................ 354/156
[51] Int. Cl. ......................................... G03b 17/44
[58] Field of Search ................................ 95/42

[56] References Cited
UNITED STATES PATENTS
3,628,436  12/1971  Sato ........................................ 95/42
3,736,850  6/1973  Ishikawa ............................ 95/42 X Primary Examiner—Samuel S. Matthews
Assistant Examiner—Michael L. Gellner
Attorney, Agent, or Firm—Wolder & Gross

[57] ABSTRACT

A single lens reflex camera is provided with an electrically controlled shutter network including an electromagnet in which, when the electromagnet fails to operate due to the drop of the battery voltage below a predetermined value, the movable reflex mirror, which is movable between the viewing position and the picture taking position, is arrested and held in the picture taking position, after the releasing operation of the shutter, by means of the shutter releasing operation coupled with the movable member actuated by the electromagnet, providing an indication to the photographer of insufficient battery voltage, but enabling the film winding and shutter releasing operations for subsequent photographing.

17 Claims, 22 Drawing Figures

SINGLE LENS REFLEX CAMERA PROVIDED WITH A SHUTTER CONTROLLED ELECTRICALLY

FIELD OF THE INVENTION

The present invention relates to a single lens reflex camera provided with an electrically controlled shutter and more particularly to a camera provided with an electrically controlled shutter which provides an indication of the failure of the shutter speed control network by means of an electromagnet due to insufficient voltage at the electric power source, the electric power source being provided for the electric control means for controlling the shutter speed.

BACKGROUND OF THE INVENTION

Hitherto, in a camera provided with an electric means which electrically controls the shutter speed, in case the voltage at an electric power source of the electric control means is lowered and thereby the electromagnet fails to control the shutter speed by means of the output from the electric control means, such a failure being hereinafter referred to as the abnormal condition of the power source battery, there has been proposed mechanisms for locking the releasing operation of the shutter release button or to arrest a movable reflex mirror in the course of the rotation between the viewing position and the picture taking position, whereupon an indication is given to an operator by abnormally conditioning the camera mechanism.

In other words, in such a known camera, when the electric control means fails, the shutter releasing mechanism or winding mechanism is brought into abnormal condition, whereby an abnormal condition indication is given to an operator. Accordingly, even if a battery is replaced for a new one to thereby restore the abnormal condition of the battery to the normal, the abnormal condition of the camera cannot immediately be restored to normal, and thus there arises the necessity to reset the abnormal condition of the camera to the normal by means of another separate means. It follows then that the releasing operation of the shutter as well as the winding operation becomes impossible, unless such resetting is accomplished.

Thus, the separate resetting operation of the camera in addition to the replacement of the battery for the purpose of bringing the camera and electric control means to the normal condition, results in the use of two types of operations, thereby presenting complexity and inconvenience to the operations.

THE OBJECT OF THE INVENTION

It is accordingly one object of the present invention to provide a single lens reflex camera provided with an electrically controlled shutter in which, when the voltage at the electric power source in the electric control means for use in controlling the shutter speed is lowered below a given value, thus resulting in the operational failure of the shutter speed control by means of the electromagnet, the movable reflex mirror, which is adapted to be moved from the viewing position to the picture taking position, is arrested and held in place by means of the shutter releasing operation, whereby an indication of the abnormal condition of the battery is provided to an operator, thus maintaining the shutter releasing mechanism and winding mechanism of the camera in the normal condition.

It is another object of the invention to provide a single lens reflex camera, in which when the voltage at an electric power source of the electric control means for use in controlling the shutter speed is lowered below a given value at which the control of the shutter speed by means of the electromagnet fails, the shutter speed is mechanically controlled for exposure by means of the shutter releasing operation, while upon completion of the exposure, the movable reflex mirror of the camera is arrested and held in place in the picture taking position to thereby provide an indication to an operator of the abnormal condition of the energizing battery, whereby the shutter releasing mechanism and winding mechanism of the camera may be maintained in the normal condition.

It is a further object of the invention to provide a single lens reflex camera provided with an electric control means adapted to electrically control the shutter speed, mechanical control means to control the shutter speed mechanically and a selecting member to select the aforesaid control means; in which, at the time when the selecting member selects the electric control means, with the voltage at the electric power source of the electric control means being lowered below a suitable operable voltage, whereby the electric control of the shutter speed fails, then the shutter speed may be controlled for exposure by means of the releasing operation and mechanical control means, while upon completion of the exposure, the movable reflex mirror is arrested in the picture taking position and held in place while providing an indication to an operator of the abnormal condition of the energizing battery, and in addition when the selecting member selects the mechanical control means, the movable reflex mirror at the picture taking position is released from being arrested.

These and other objects of the invention will be clear from the reading of the ensuing specification with reference to the described embodiments of the invention.

SUMMARY OF THE INVENTION

To attain the aforesaid objects, the present invention provides a single lens reflex camera adapted to being electrically controlled in which, when the voltage at the electric power source of electric control means is lowered below a given value and thereby the electromagnet fails to control the completion of the exposure, a movable reflex mirror is arrested and held in place, even after the releasing operation of a shutter has been effected by means of a movable member operable by the shutter releasing operation and by the electromagnet to control the exposure completion in the electric control means; said movable reflex mirror being adapted to move between the viewing position and the picture taking position and to be driven from the viewing position to the picture taking position by means of the releasing operation, while being restored from the picture taking position to the viewing position after the shutter has been released; whereby the abnormal condition of the voltage at the electric power source of the electric control means is indicated to an operator through a viewfinder.

One feature of the present invention is that when the control by means of an electromagnet for the completion of exposure fails due to the lowered voltage of the electric control means, the movable reflex mirror of the single lens reflex camera is arrested in the picture taking position and held therein, whereupon an alarm is given to an operator through a viewfinder of the abnormal condition where the electric control means fails to control the shutter, in a manner that said alarm is given without causing a cndition which interrupts the shutter mechanism and the winding mechanism of the camera.

Accordingly, a single operation to restore the abnormal condition of the electric control means back to the normal by means of replacing the battery as indicated by the aforesaid alarm enables the winding of the film, shutter cocking and shutter releasing operations for the subsequent photographing.

Another feature of the present invention is that even in case the electric control mans is in the abnormal condition unable to control the exposure control, as has been described, the shutter speed control means is automatically switched to the mechanical control means, although the shutter releasing operation may be effected by means of the shutter releasing operation, and at the same time the movable reflex mirror, even after the completion of the exposure, is arrested in the picture taking position and held therein, whereby the abnormal condition of the electric control means is indicated to an operator, notifying that the photographing has been controlled for the exposure by means of the mechanical control means.

A still further feature of the invention is that there is provided for a camera a selecting member to select among the shutter speed controls by means of an electric control means and by means of a mechanical control means, whereby when the selecting member selects the shutter speed control by means of the mechanical control means, the movable reflecting mirror in the picture taking position, after the exposure, may be released from being arrested, followed by its restoration to the viewing position immediately after the completion of exposure, despite the abnormal or normal condition of the electric control means.

BRIEF DESCRIPTION OF THE DRAWINGS

FIGS. 4 and 5 are side elevations of the arresting mechanism of the movable reflex mirror of the first embodiment, in which FIG. 4 shows the completion of the shutter cocking, while FIG. 5 shows the movable reflex mirror being arrested and held in the picture taking position, even after the completion of the shutter releasing operation, in the abnormal condition of the electric control means;

FIGS. 9 and 10 are top plan views of the third embodiment of the present invention, in which FIG. 9 shows the shutter being in a cocked position and FIG. 10 shows the movable reflex mirror being arrested and held in the picture taking position, even after the completion of the shutter releasing operation;

FIGS. 11 to 13 are top plan views of the fourth embodiment of the invention, in which FIG. 11 shows the shutter being in a cocked position, FIG. 12 shows the normal condition of the electric control means at the time of shutter releasing operation, and FIG. 13 shows the abnormal condition of the electric control means;

FIGS. 14 to 22 show the principal parts of a mechanism in accordance with the fifth embodiment of the invention, in which FIG. 14 is a view thereof showing the shutter being in a cocked position, FIG. 15 shows the condition immediately after the commencement of exposure in the normal condition of the electric control means which has been selected, FIG. 16 shows the condition immediately after the commencement of exposure in the abnormal condition of the electric control means, and FIG. 17 shows the condition after the completion of exposure in the abnormal condition of the electric control means;

FIGS. 18 to 20 are views showing the relationship of the movement of the movable reflex mirror in the previous embodiment to that of an arresting member, in which FIG. 18 shows the condition immediately after the shutter releasing operation, FIG. 19 shows the electric control means being in the abnormal condition and the movable reflex mirror being arrested and held in the picture taking condition, even after the completion of the exposure, FIG. 20 shows the condition after the completion of the exposure in case the mechanical control means is selected; and FIGS. 21 and 22 are top views showing the switching by means of the selecting member, in which FIG. 21 shows the case where the electric control means is selected, and FIG. 22 shows the case where the mechanical control is selected.

DETAILED DESCRIPTION OF THE INVENTION

Figure 1:
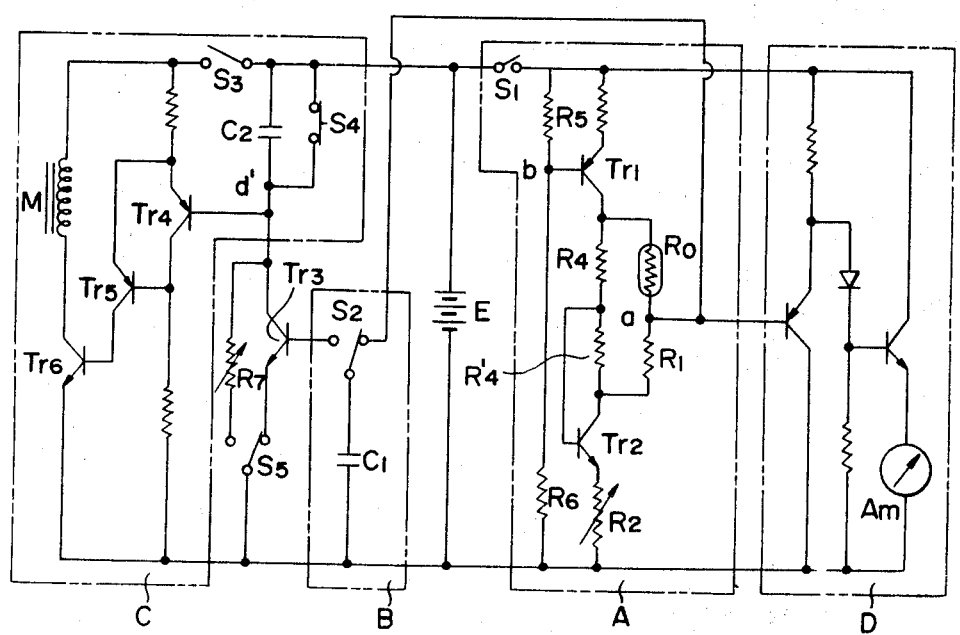
FIG. 1 is a circuit diagram of an electric control network of one embodiment of the present invention.

The electric control network as shown by way of example in FIG. 1 consists of a photometering circuit A, a member circuit B, an exposure duration control circuit C and a meter circuit D; in which the electric power source E is connected through a power source switch $S_1$ across series connected resistors $R5$ and $R6$ of the photometering circuit A; the junction point $b$ of the bleeder resistors $R5$ and $R6$ is connected to the base of the first transistor $Tr_1$. A circuit, consisting of a light receiving photosensitive element or photoresistor $R_0$ and the resistor $R_1$ connected in series thereto, across which are connected the series connected resistors $R_4$ and $R_4'$, is connected between the collector of the first transistor $Tr_1$ and the collector of the second transistor $Tr_2$, the resistor $R_4'$ being connected between the base and collector of the second transistor $Tr_2$, and the emitter of the second transistor $Tr_2$ being connected to a variable resistor $R_2$ adapted to adjust the resistance in response to the set film sensitivity and to the diaphragm aperture to be adjusted at the time of photographing. The output from the light receiving element $R_0$, commensurate to the brightness of the object, can be obtained as a voltage at the junction point $a$ of photoconductor $R_0$ and resistor $R_1$, and in turn, the voltage thus obtained is impressed via a switch $S_2$ to the capacitor $C_1$ of the memory circuit B.

When the shutter speed dial, which is a selecting member which will be described later, selects the electric control, then the switch $S_1$ is closed, thereby connecting the light receiving element $R_0$ and resistor $R_1$ with the power source, and on the other hand, when the shutter speed dial selects the mechanical control, the power source switch $S_1$ is maintained in open condition.

The combined resistance of resistors $R_4$ and $R_4'$ is set to a small value as compared with the combined resistance of the light receiving element $R_0$ and resistor $R_1$, such that a majority of the collector current of the first transistor $Tr_1$ flows through the resistors $R_4$ and $R_4'$, said collector current being a constant current, impressing a constant voltage across the light receiving element $R_0$ and resistor $R_1$.

The capacitor $C_1$ of the memory circuit B is charged to the voltage at a point $a$, when the switch $S_2$ is connected to the photometering circuit A, and then the voltage thus impressed is stored by transferring the switch $S_2$, and the thus stored voltage is impressed between the base of the transistor $Tr_3$ and the emitter thereof.

The switch $S_2$ is normally connected to the photometering circuit A and adapted to switch to the side of the third transistor $Tr_3$, prior to the rotation of the movable reflex mirror from the viewing position to the picture taking position.

Connected in parallel to the collector of the third transistor $Tr_3$ are a capacity $C_2$ for use in delaying the exposure duration for the exposure duration control circuit C and a timing switch $S_4$, the junction point $d$ of which is connected as an input to the base of the fourth transistor $Tr_4$. Connected to the collector of the third transistor $Tr_3$ is a variable resistor $R_7$, and either the resistor $R_7$ or the emitter of transistor $Tr_3$ is connected by means of switch $S_5$ to the power source E. The above switch $S_5$ is connected to the emitter side of the third transistor $Tr_3$ in case the selecting member selects the electric exposure control, while being connected to the variable resistor $R_7$ side with the exposure duration being set manually, and thus the exposure time may be set by setting the resistance of the variable resistor $R_7$.

The switch $S_3$ disposed between the emitter side of the fourth transistor $Tr_4$ and the power source E is the main switch of the electrical exposure control circuit, and said switch $S_3$ will be closed when the selecting member selects the electric control and will be opened when the selecting member selects the mechanical control.

The output of the fourth transistor $Tr_4$ in the switching circuit is fed via the fifth transistor $Tr_5$ to the sixth transistor $Tr_6$, with the electromagnet coil M being connected to the collector of the sixth transistor $Tr_6$, said coil being adapted to control the closure of the shutter. The electromagnet coil M is excited by rendering the transistor $Tr_6$ conductive while the capacitor $C_2$ reaches a given level with the main switch being closed, while being demagnetized due to the transistor being cut off when the capacitor $C_2$ reaches a given level.

The meter circuit D indicates on the ammeter (Am) the shutter speed which is automatically controlled electrically, and the ammeter A$m$ responds to the output voltage at the point (a).

Turning now to the first embodiment of the invention shown in FIGS. 2 to 5, the control lever 2 engageable at a notch 2c with a releasing lever 1 is rotatably journaled on a shaft 3 and tends to rotate in a clockwise direction under the action of a spring 3a. The electromagnetic lever 4, which has an armature 6 cooperating with the electromagnet 5 which is operable depending on the supply or interruption of the electric current to or with the electromagnet coil M, is rotatably journaled on a shaft 15a and has a spring 7 between the control lever 2 and said lever 4, having an operating pin 4b on one arm and an engaging piece 4a on the other.

An engageable and disengageable member 8 (which will be hereinafter referred to as an engagement member) having an engageable bent portion 8a which is engageable with the engaging piece 4a, has guide groove 8d adapted to receive a guide pin 11 fixed on a camera, being positioned as shown by solid line in FIG. 2 under the action of a spring 9 in a cocked condition of a shutter. The engagement member 8 is provided with a manipulating piece 8b engageable with a stop member 10 which will be referred to in detail later, a pin 8c engageable with the end face 2a of the control lever 2, and an end face 8e engageable with the shutter-opening driving lever 12 which will be described later.

The stop member 10, which tends to rotate in a clockwise direction under the action of a spring 18 and which is journaled on a shaft 10a, is provided on one arm thereof with engaging piece 10b engageable with the manipulating piece 8b and an operating arm 10c engageable with the reflex mirror arresting member 10.

Figure 2:
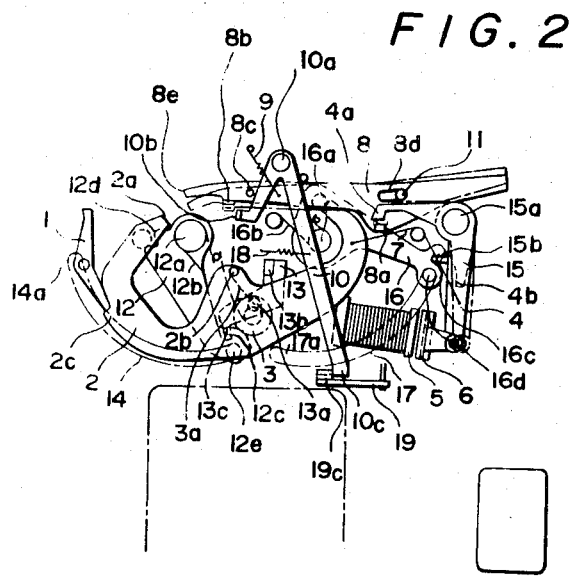
FIG. 2 is a rear view showing the essential parts of the mechanism for detecting whether the operation of the electric control means of the first embodiment of the invention is normal or abnormal.

An arresting lever 13, which is rotatably journaled on a shaft 13a and tends to rotate in a counterclockwise direction under the action of a spring (not shown), is engageable with a pin 2b located on the control lever 2, a bent portion 13b engageable in the rotating course of the control lever 2 and a hook portion 13c on the other end thereof; the lever 12 being journaled on a shaft 12a in the cocked condition of shutter as shown in FIG. 2, hook portion 13c engaging the hook portion 12c of the open driving lever 12 which tends to be rotated in a clockwise direction by means of a spring 12b. Driving lever 12 is provided with a projection 12d engageable with the end face 8e of engagement member 8 and with a pin 12e adapted to fit in arcuate groove 14, such that when the pin 12e reaches the end portion 14a of the arcuate groove 14, then the shutter will be fully opened.

An arresting lever 15, which is journaled coaxially on a shaft 15a of the electromagnetic lever 4 and which is adapted to rotate in a counterclockwise direction in engagement with the pin 4b, is provided with an arresting projection 15b. The shutter-closing driving lever 16, which tends to rotate in a clockwise direction by means of a spring 16b, has a hook portion 16c and a pin 16d. Said arresting projection 15b engages the hook portion 16c by being fitted therebetween in a cocked condition of the shutter as shown in FIG. 2. When the aforesaid arresting lever is released, then the pin 16d will rotate along the arcuate groove 17, and thus the shutter completes its closing at the end portion 17a.

Figure 4:
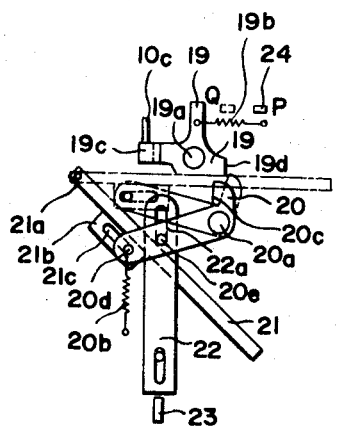
Figure 5:
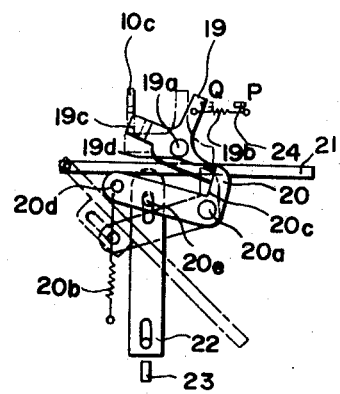

As shown in FIGS. 4 and 5, the operating arm 10c of stop member 10 engages the bent portion of the reflex mirror stop member 19 which is journaled on shaft 19a and which tends to rotate in a clockwise direction under the action of a spring 19b. There is formed an arresting edge 19d on the reflex mirror arresting member 19.

The movable reflex mirror 21 is rotatably journaled on a shaft 21a and has an operating frame 21b having an elongated slot 21c.

A pin 20d of a reflex mirror-arresting-auxiliary member 20 which tends to rotate in a counterclockwise direction by means of a spring 20b is rotatably journaled on a shaft 20a slidably engages elongated slot 21c. In addition, the reflex mirror-arresting-auxialiary member 20 has a pin 20e and an engaging face 20c, pin 20e being slidable in an elongated slot 22a of an intermediate member 22 sliding movable in a vertical direction with respect to the camera body by means of the reflex mirror driving member.

Shown at 24 is a switching member which is adapted to switch the position P of the electric exposure control to the position Q of the mechanical exposure control in cooperation with the selecting member and adapted to disengage the movable reflex mirror 21 at the picture taking position when said switching member is in the position Q of the mechanical exposure control.

In operation of the first embodiment of the present invention:

1. In the case of the electromagnet 5 being operated normally, when the shutter causes the releasing lever 1 to rotate in a clockwise direction in FIG. 2 showing the shutter being cocked, the control lever 2 will start rotating in a clockwise direction, whereupon main switch $S_3$ is closed to thereby excite the electromagnet 5, thus attracting the armature 6, holding the electromagnetic lever 4 in the position shown by solid line. Accordingly, the rotation of the control lever 2 in a clockwise direction loads the spring 7. Since the engaging piece 4a and engaging bnt portion 8a are held in a manner that the both may not be mutually engaged, the engagement member 8 is maintained in the position shown by solid line, in which the engaging piece 10b of the stop member 10 is maintained in a manner not to engage the manipulating piece 8b of the engagement member 8.

In the terminal position of the control lever 2 rotating in a clockwise direction, the end face 2a thereof will abut the pin 8c of the engagement member 8 to thereby urge the engagement member 8 to the right. At this time, the engaging piece 4a and engaging bent portion 8a are maintained in a disengaged relation. Furthermore, the engaging bent portion 8a is moved to the right with respect to the engaging piece 4a, such that both member 8a and engaging piece 4a are maintained disengaged, even if the electromagnetic lever 4 rotates in a counterclockwise direction.

Figure 3:
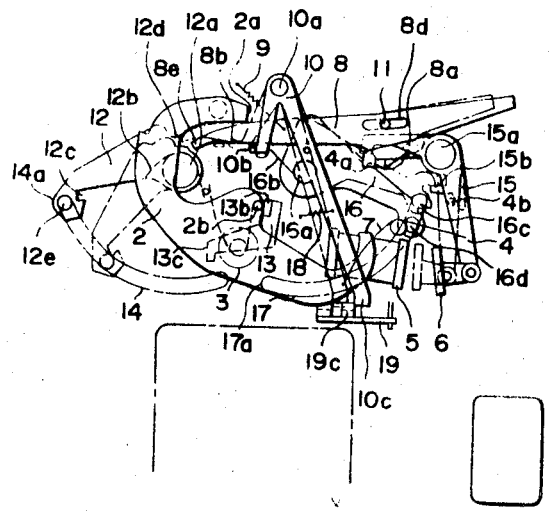
FIG. 3 is a rear view of the mechanism of FIG. 2, shown in the abnormal operation of the electric control means of the first embodiment.

At the same time, the pin 2b of the control lever 2 is opened to thereby engage the bent portion 13b of the arresting lever 13 to rotate the same in a clockwise direction, such that the hook portion 13c is opened and disengaged from the hook portion 12c of the driving lever 12, whereby the shutter-opening driving lever 12 rotates to the position shown by the solid line in FIG. 3. At this time, the engagement member 8 has moved to the right, and thus the projection 12d does not interfere with the end face 8e.

Subsequently, when the delay capacitor $C_2$ of the exposure duration control circuit reaches a given level, then the switching circuit deenergizes the electromagnet 5, while the electromagnetic lever 4 rotates in a counterclockwise direction about the shaft 15a under the action of a spring 7, whereby the pin 4b rotates the shutter-closing arresting lever 15 in a counterclockwise direction, whereupon the arresting projection 15b is disengaged from the fork portion 16c, thus releasing the engagement of the shutter-closing driving lever 16, and thus the driving lever 16 rotates in a clockwise direction by means of the spring 16b, completing the exposure at the end portion 17a of the arcuate groove 17. During this time, the stop member 10 is not operated, such that the reflex mirror arresting member 19 will not be rotated, and the reflex mirror 21 will be restored to the viewing position upon completion of the exposure.

2. In the case of the electromagnet being operated in an abnormal condition:

The force to urge the spring 7 due to the rotation of the control lever 2 by means of the shutter releasing operation acts on the electromagnetic lever 4, since the electromagnet 5 is not excited, to rotate the same in a counterclockwise direction. By this, the engaging piece 4a engages the engaging bent portion 8a, while the engagement member 8 rotates in a counterclockwise direction about the guide pin 11 to eventually assume the position as shown in FIG. 2. Thus, the manipulating piece 8b assumes the position to engage the engaging piece 10b of the stop member 10.

In this condition, the pin 8c is maintained in a position retracted from the abutting position, even if the end face of the control lever 2 rotates, while the end face 8e of the engagement member 8 advances to a position engaging the projection 12d, when the shutter-opening driving lever 12 rotates. Accordingly, when the shutter-opening arresting lever 13 is operated by means of pin 2b at the terminal position of the rotation of the control lever 2 to thereby disengage the arresting lever 13, the open driving lever 12 will rotate in a counterclockwise direction and the projection 12d urges the end face 8e of the engagement member 8 to the right, whereupon the engagement member 8 is urged against the spring action of a spring 9 to the position as shown by the solid line in FIG. 3, with the manipulating piece 8b thereof engaging the engaging piece 10b, thus rotating the stop member 10 against the action of the spring 18 in a counterclockwise direction. This means that the operating arm 10c in FIG. 4 is moved upwardly as shown in FIG. 5, and thus the reflex mirror arresting member 19 rotates in a clockwise direction by means of spring 19b, if the switching member 24 is in the position P. On the other hand, prior to the rotation of the shutter-opening driving lever 12 due to the rotation of the control lever 2, the movable reflex mirror 21 rotates from the viewing position to the picture taking position by means of reflex mirror arresting auxiliary member 20 via intermediate member 22 with the aid of the reflex mirror driving member 23, such that the engaging face 20c of the reflex mirror arresting auxiliary member 20 engages the arresting edge 19d of the reflex mirror arresting member 19, while the movable reflex mirror 21 is arrested in the picture taking position. Thus, even if the reflex mirror driving member 23 and the intermediate member 22 have been restored to their retracted positions, the aforesaid engaging position will be maintained.

On the other hand, the engaging bent portion 8e is disengaged from the engaging piece 4a due to the engagement member 8 sliding to the right, and thus the electromagnetic lever 4 rotates through a large angle in a counterclockwise direction to thereby disengage the arresting projection 15b from the fork portion 16c, such that shutter-closing driving lever 16 rotates under the action of a spring 16b in a clockwise direction. As a result, when the pin 16d reaches the end portion 17a of the arcuate groove 17, the shutter will be closed completely. In other words, the speed of the shutter is adjusted through mechanical operation rather than through electric control.

The position of movable reflex mirror 21 maintained in the picture taking position by means of the reflex mirror arresting member 19 continues, even after the completion of the exposure, as described, such that the abnormal condition may be notified because the view of the finder is kept interrupted even after completion of the exposure.

However, since the cocking of the shutter leads to winding operation of a film which, in turn, rotates the shutter-opening driving lever 12 in a counterclockwise direction, whereby the engagement member 8 is urged to the left by means of a spring 9. This causes the stop member 10 to rotate in a clockwise direction, such that the arresting edge 19d is disengaged from the engaging face 20c, while the movable reflex mirror 21 may be restored automatically under the action of the spring 20b from the viewing position to the picture taking position to thereby bring the camera back to the normal condition. In short, this eliminates the specific member or operation to reset the camera to the normal condition.

However, in case of the continuous mechanical exposure control, when the viewing position cannot be assumed, unless the movable reflex mirror is maintained in the picture taking position and yet the subsequent winding operation is performed, thus causing troublesome operation, then the switching member 24 should preferably be switched to the position Q. In this manner, when the reflex mirror arresting member 19 rotates, the switching member 24 arrests the projection 19e against the spring action of the spring 19b, such that the arresting edge 19d is disengaged from the engaging face 20c of the reflex mirror arresting auxiliary member 20, and thus the arresting is not effected at the picture position of the movable reflex mirror 21. On the other hand, when the switching member arrested is in the position P, such arresting may be released due to the shifting of the switching member 24 to the position Q.

Figure 6:
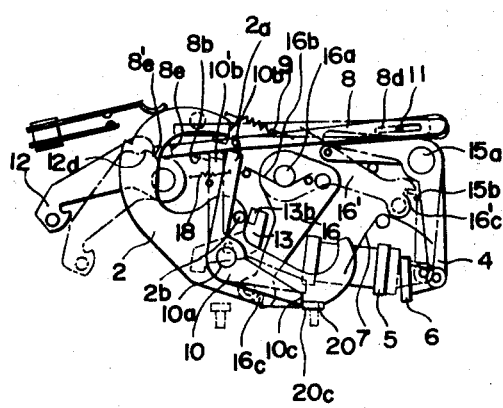
FIG. 6 is a rear view of the essential parts of the mechanism for detecting the operational condition of the electric control means in accordance with a second embodiment of the present invention.

FIG. 6 shows the second embodiment which is modified from the first embodiment and will be first considered with reference to the abnormal operation of the electromagnet 5. When the control lever 2 is released through the releasing operation and thus rotates in a counterclockwise direction, the force acting on the spring 7 and thus biasing the same will rotate in a counterclockwise direction by means of the electromagnetic lever 4 which is used in place of the shutter-closing arresting lever, to avoid the electromagnet from being excited. At the same time, the arresting projection 15b is disengaged from the fork portion 16c, such that the shutter-closing driving lever 16 rotates under the spring action of the spring 16b in a clockwise direction to thereby close the shutter. On the other hand, the engagement member 8 rotates in a counterclockwise direction about the guide pin 11, coupled with the electromagnet 4, as shown by the broken line in FIG. 6, while the end faces 8e enters into the path of the projection 12d of the shutter-opening driving lever 12, and at the same time the manipulating piece 8b assumes the position which permits the engagement with the engaging piece 10b of the stop member 10.

As a result, the pin 2b of the control lever 2 rotates the engaging lever 13 in a clockwise direction at the terminating point of its rotation, thereby disengaging the shutter-opening driving lever 12 to open the shutter, while the projection 12d abuts the end face 8e' of the engagement member 8 at the terminating end of the shutter-opening driving lever 12 to thereby urge the engagement member 8 to the right to the position shown by solid line against the action of the spring 9, and the manipulating piece 8b engages the stop member 10 to rotate the same in a clockwise direction. As a result, the operating arm 10c directly engages the engaging face 20c of the reflex mirror arresting auxiliary member 20 as shown in FIGS. 4 and 5 to arrest and maintain the movable reflex mirror in the picture taking position.

Figure 7:
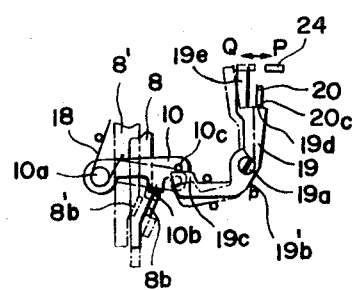
FIG. 7 is a side elevation thereof showing a mechanism adapted to arrest and hold the movable reflex mirror in the picture taking position, even after the completion of the shutter releasing operation.
Figure 8:
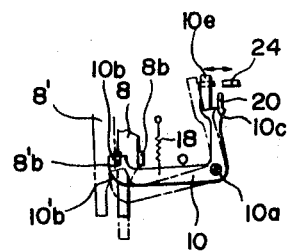
FIG. 8 is a side elevation showing a modification of the embodiment of FIG. 7.

The second embodiment is shown in FIGS. 7 and 8, in which the reflex mirror arresting auxiliary member 20 is arrested by means of the stop member 10 which is adapted to be operated by the aforesaid engagement member 8.

As shown in FIG. 7, when the electromagnet 5 operates normally, the engaging member 8 moves in a vertical direction at the position shown by the chain line 8' and thus the manipulating piece 8b' is disengaged from the engaging piece 10b. In contrast thereto, when the electromagnet 5 does not operate normally, the engagement member 8 moves vertically between the positions shown by the solid and broken lines. Thus, when the engagement member 8 moves upwardly from the broken line to the solid line position by means of the projection 12d of the shutter-opening driving lever 12, the manipulating piece 8b rotates the stop member 10 in a counterclockwise direction against the action of the spring 18 by engaging the engaging piece 10b, whereupon the shifting of the operating pin 10c rotates the reflex mirror arresting member 19 in a clockwise direction by means of the spring 19b, and the arresting edge 19d engages the underside of the engaging face 20c of the reflex mirror arresting auxiliary member 20 to maintain the reflex mirror arresting auxiliary member 20 restoring downwardly, whereby the movable reflex mirror is maintained in the picture taking position. The aforesaid engagement will continue until the manipulating piece 8b is disengaged from the engaging piece 10b.

As is clear, the manual shifting of the switching member 24 from the position P of the electric control, shown by the solid line, to the position Q of the mechanical control causes the projection 19e to shift forward, such that the engaging edge 19d of the reflex mirror arresting member 19 is retracted from the engaging face 20c of the arresting auxiliary member by reason of the elastic deformation thereof to thereby disengage one from the other.

The embodiment as shown in FIG. 8 is one modification of the second embodiment which contemplates causing the stop member 10 to follow the engagement member 8 by means of the spring 18. Like the second embodiment, when the electromagnet 5 operates normally, the engagement member 8 is in the position shown by the chain line 8', while the manipulating piece 8b' is on the engaging piece 10b projecting from the stop member 10, to thereby rotate the stop member 10 to the position shown by the chain line against the action of the spring 18, thus disengaging the operating arm 10c from the reflex mirror arresting auxiliary member 20.

In contrast thereto, when the electromagnet 5 is not excited normally, the engagement member 8 is shifted so that the manipulating piece 8b is disengaged from the engaging piece 10b and moves to the position shown by the solid line to rotate the stop member 10 in a clockwise direction, and thus the operating edge 10c thereof directly engages the underside of the reflex mirror auxiliary arresting member 20, while arresting the movable reflex mirror in the picture taking position. In this respect, the switching member 24 directly engages the projection 10e for controlling the shutter mechanically, thereby disengaging the operating edge 10c from the reflex mirror auxiliary arresting member 20.

Figure 9:
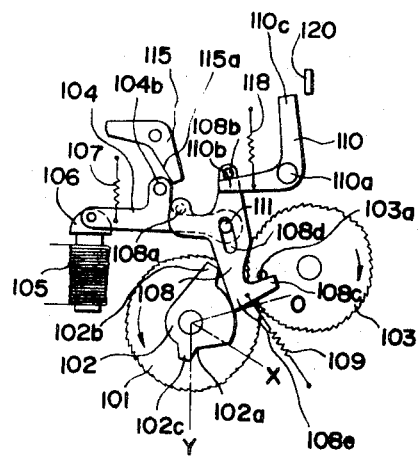
Figure 10:
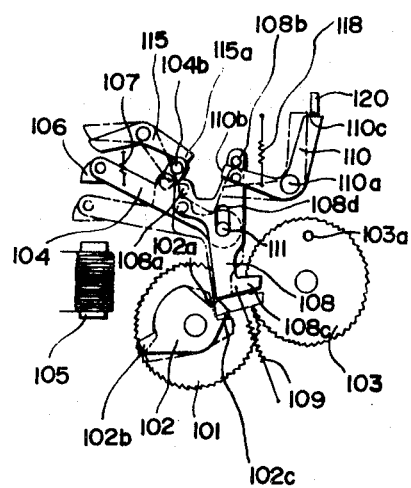

The third embodiment is shown in FIGS. 9 and 10 and is largely different in design from that of the previous embodiment.

The reflex mirror driving gear 101 which is adapted to be engaged or disengaged by means of the releasing lever (not shown), tends to rotate in a counterclockwise direction and is fixedly journaled coaxially with a cam plate 102 having a projection 102c, a notch 102a and another projection 102b, gear 101 meshing with the shutter releasing gear 103 to thereby rotate the same in a clockwise direction.

The electromagnet actuated lever 104, which has an armature 106 adapted to be attracted by an electromagnet 105 in the course from the starting point of the reflex mirror driving gear 101 to the first rotational point $x$, is journaled on a shaft 111 and tends to rotate by means of a spring 107 in a clockwise direction.

An engagement member 108 having a guide groove 108d receiving the shaft 111 is biased by means of a spring 109 as shown, while the engaging pin 108a engages the electromagnetic lever 104 and has the end face 108e and an engaging arm 108c on its underside, and an actuating pin 108b on the upper side.

A stop member 110, which tends to be rotated under the action of a spring 118 and which is journaled on a shaft 110a, has an engaging arm 110b engaging pin 108b, with the other arm 110c being retracted from the operating path of the reflex mirror arresting auxiliary member 120 in the cocked condition of the shutter.

In operation of the third embodiment in the case of the normal operation of electromagnet 105, due to the releasing operation of the shutter, a reflex mirror driving gear 101 begins to rotate in a counterclockwise direction, while the shutter releasing gear 103 rotates in a clockwise direction. The movement of respective gear to rotate the movable reflex mirror from the viewing position to the picture taking position and the subsequent releasing operation of the shutter are carried out by means of a mechanism (not shown).

In the course of the reflex mirror driving gear 101 moving from the starting point O to the first rotating point X, the electromagnet 105 is excited and the armature 106 of the electromagnet lever is attracted thereto to the position shown in FIG. 9. At the same time, the engagement member 108, which tends to rotate in a counterclockwise direction with respect to the shaft 111 at the upper end of the guide groove 108d, being urged under the spring action of the spring 109, is retracted to the position where the end face 108e is not in engagement with the projection 102c having an engaging notch portion 102a of the control cam plate 102, as shown in FIG. 9. Accordingly, even if the control cam plate 102 rotates beyond the second rotational point Y, the engagement member 108 maintains the position as shown in FIG. 9.

When the electromagnet 105 is demagnetized by means of the switching circuit, then the electromagnetic lever 104 rotates in a clockwise direction and then the pin 104b engages an arm 115a of a shutter-closing arresting lever 115 to thereby rotate the same in a counterclockwise direction. This further causes the shutter-closing driving member to be disengaged, thereby closing the shutter, and then the engagement member 108 rotates in a clockwise direction by way of an engaging pin 108a which engages lever 104, while rotating in the low position with the upper end of the guide groove 108d engaging the shaft 111 by means of a spring 109, such that the manipulating pin 108b causes the stop member 110 to be retracted from the operational path of the reflex mirror arresting auxiliary member 120 against the spring action of a spring 118, whereby the arresting of the movable reflex mirror due to the engagement may not result.

In the case of the normal operation of the electromagnet 105, the reflex mirror driving gear 101 and shutter releasing gear 103 begin to rotate, to thereby effect the aforesaid operation. Thus, even if the switching circuit closes the circuit of the electromagnet 105, with the control cam plate 102 rotating from the starting point O to the first rotating point X, the electromagnet 105 will not be excited, such that the electromagnetic lever 104 rotates in a clockwise direction under the spring action of the spring 107 as shown in FIG. 10, and the pin 104b rotates shutter-closing arresting lever 115 to thereby start the closing operation of the shutter, while rotating the engagement member 108 in a clockwise direction against the action of the spring 109 at a position as shown in FIG. 9.

As a result, when the control cam plate 102 rotates from the first rotational point X to the second rotational point Y, the engaging notch portion 102a engages the end face 108e of the engagement member 108, thereby causing engagement member 108 to move upwardly therewith along the guide groove 108d to a position as shown by the solid line in FIG. 10. Accordingly, under the action of the spring 118, the engaging arm 110b of the stop member follows the upwardly moving manipulating pin 108 and rotates in a clockwise direction, such that the operating arm 110c thereof enters the path of the downward movement of the reflex mirror arresting auxiliary member 120 to thereby arrest the same, maintaining the movable reflex mirror in a picture taking position.

When the shutter is cocked, the reflex mirror driving gear 101 rotates in a clockwise direction by means of a mechanism (not shown), while the shutter releasing gear 103 rotates in a counterclockwise direction. Thus, the pin 103a located on the shutter releasing gear 103 engages the engaging arm 108c of the engagement member 108, thereby urging the member 108 in an urging direction of the spring 109 against the spring action of springs 107 and 118 to thereby move the same downwardly, such that every member is restored to their initial positions as shown in FIG. 9, thus completing the cocking of the shutter.

In the aforesaid embodiments, the shutter need not be a lens shutter. Therefore, it is clear that the shutter-opening drive of the shutter can be construed to be the release from arresting operation of the forward curtain of the focal plane shutter, while the shutter-closing drive of the shutter means effects the release of the rear curtain.

Figure 11:
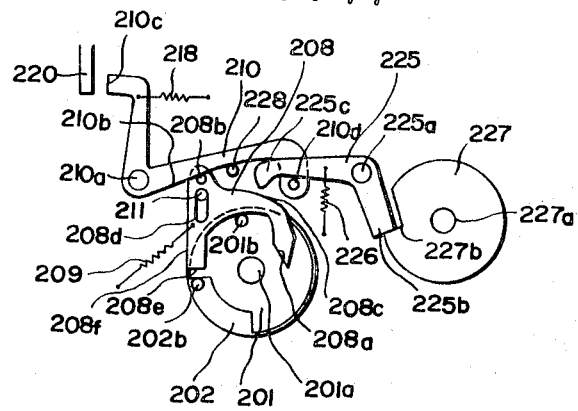
Figure 13:
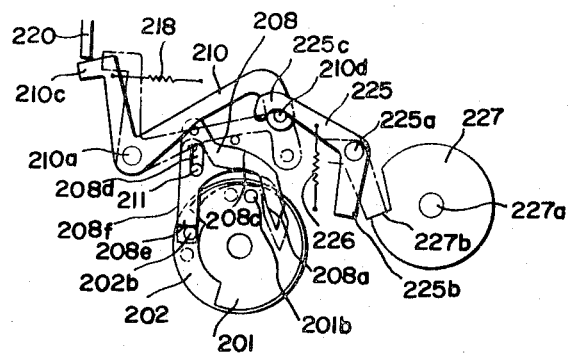

The fourth embodiment of the present invention as shown in FIGS. 11 and 13 is directed to utilizing the same for the focal plane shutter, and particularly to providing a winding stop member.

Journaled loosely on a shaft 201a of a forward curtain gear 201 is a rear curtain gear 202, while engaging pins 201b and 202b are located on each of said gears.

A U-shaped engagement member 208 having two arms is freely fitted on a shaft 211 which engages a guide groove 208d, and is biased by a spring 209, as shown. Provided in the tip portion of the first arm of the engagement member 208 and on its inner side is an engaging edge 208a, said first arm cooperating with engaging pin 201b, and also provided in the tip portion thereof on the outer side thereof is an operating edge 208c, while the second arm with which cooperates the engaging pin 202b, is formed with an engaging end face 208e on its tip portion and also formed with sliding face 208f on its outer side, and an actuating pin 208b is mounted thereon at a point in alignment with guide groove 208d.

One arm of the stop member 210, which tends to rotate in a clockwise direction by means of a spring 218 and which is journaled on a shaft 210a, is formed with an engaging edge 210b which is adapted to engage with or disengage from pin 208b, while the tip portion of the arm mounts a releasing pin 210d, and the tip portion of the other arm is formed with an operating arm 210c which is adapted to engage with or disengage from the reflex mirror arresting auxiliary member 220.

A cam plate 227 having a notch arresting portion 227b is mounted and integral with a winding shaft 227a. One arresting arm 225b of a winding arresting lever 225, which tends to rotate in a counterclockwise direction by means of a spring 226 and which is journaled on a shaft 225a, engages cam plate 227, while the other arm is formed with a hook portion 225c which is adapted to engage a releasing pin 210d on stop member 210.

In the normal operation of the electromagnet in the last embodiment, upon completion of the cocking of the shutter, the rotation of the winding shaft 227a is arrested by means of arresting arm 225b of winding arresting lever 225 engaging the notch arresting portion 227b of the cam plate 227, while the hook portion 225c thereof rotates in a clockwise direction by means of a spring 218 to thereby engage releasing pin 210d of the stop member 210 which abuts the stopper 228. The operating arm 210c of the stop member 210 is retracted from the operational path of the reflex mirror arresting axuiliary member 220, and the movable reflex mirror (not shown) is in the viewing position.

Following the shutter releasing operation, the movable reflex mirror rotates to a picture taking position and then the forward curtain gear 201 begins to rotate in a clockwise direction. At this time, even if the rear curtain gear 202 is ready to rotate in a clockwise direction, the rear curtain arresting member (not shown) arrests the rear curtain gear rotation by means of an electromagnet.

Figure 12:
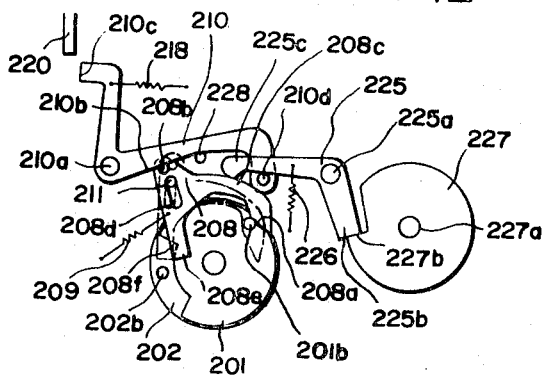

Upon rotation of the forward curtain gear 201, engaging pin 201b, which is not in contact with either of the arms of member 208 in the starting position, will slidingly contact, as it rotates, with the engaging edge 208a of the first arm, thus urging said edge away as shown in FIG. 12. Thus, the engagement member 208 rocks in a counterclockwise direction against the spring action of a spring 209 about the shaft 211 at the upper end of the guide groove 208d, while the engaging end face 208e of the second arm rotates in a direction to come closer to the gear shaft 201a from the rotational path of the engaging pin 202b, while the operating edge 208c of the first arm of the member 208 abuts the hook portion 225c, but cannot advance said hook portion.

Then, when the rear curtain gear 202 is released from its arrested position due to the demagnetization of the electromagnet, being retarded for a given period of time, and thus rotates in a clockwise direction, the engaging pin 202b abuts the sliding face 208f of the second arm of the engagement member 208 and then slides on sliding face 208f as it rotates, urging face 208f to thereby rotate the engagement member 208 in a counterclockwise direction, thus completing the exposure by means of the second curtain. Accordingly, the operating edge 208c of the first arm of the engagement member 208 which rocks in a counterclockwise direction at this time, urges the hook portion 225c so as to rotate the winding arresting lever 225 in a counterclockwise direction, and then the arresting arm 225b thereof is retracted from a notch arresting portion 227b of a cam plate 227, thereby releasing the winding shaft from its winding-stopped condition.

In the case of the abnormal operation of the electromagnet, as in the previous case, after the movable reflex mirror rotates to the picture taking position through the releasing operation, when the forward curtain gear 201 begins to rotate with the engaging pin 201b, the electromagnet will not be excited normally, such that the rear curtain gear 202 is released from being arrested, and thus the gear 201 begins to rotate with the engaging pin 202b.

As a result, the engaging pin 201b abuts the engaging edge 208a of the first arm of the engagement member 208 to thereby rotate the same in a counterclockwise direction, and until then the engaging pin 202b has abutted the engaging end face 208e of the second arm. Thus, the engagement member 208 is urged upwardly to a position where the lower end of the guide groove 208d engages the shaft 211, as shown in FIG. 13, from the position where the upper end of the guide groove 208d engages the shaft 211, as shown in FIG. 11. Accordingly, the pin 208b abuts the engaging edge 210b of the stop member 210 and urges the same upwardly, such that the stop member 210 rotates against the action of the spring 218 in a counterclockwise direction, and the operating arm 210c thereof thus rotates to a position where it engages the reflex mirror arresting auxiliary member 220 to thereby arrest the same, such that the movable reflex mirror is arrested and held in its picture taking position.

Then, the releasing pin 210d engages the hook portion 225c of the arresting lever 225 to thereby rotate the same against the spring action of the spring 226 in a clockwise direction, such that the arresting arm 225b thereof is retracted from the notch arresting portion 227b of the cam plate 227, thereby releasing the winding shaft 227a.

On the other hand, the engaging pin 201b of the rotating forward curtain gear 201, engages the engaging edge 208a of the engagement member 208 which assumes an upwardly-moving position as it rotates, thereby rotating the same in a counterclockwise direction, while disengaging the engaging pin 202b from the engaging end face 208e, and thus the engaging pin 202b rotates while sliding on the sliding face 208f to thereby rock the engagement member 208 in a counterclockwise direction, thus completing the exposure.

In such a case, although the exposure cannot be controlled electrically, the exposure for a single shutter speed due to mechanical means can be achieved, until the engaging pin 202b is disengaged from the engaging end face 208e, so the shutter can operate for a given exposure time.

In this respect, since the rotation of the winding shaft 227a is possible, the forward and rear curtain gears 201 and 202 rotate in a counterclockwise direction through the gear mechanism (not shown) due to the rotation of the winding shaft 227a, whereupon the counterclockwise rotation of the engaging pin 202b disengages the engaging pin 202b from the second arm of the engagement member 208, while the engagement member 208 is restored to a position as shown in FIG. 11 under the spring action of the spring 209, whereby the operating arm of the stop member 210 is retracted from the reflex mirror arresting auxiliary member and then the movable reflex mirror is released from the picture taking position to directly return from the picture taking position to the viewing position.

Figure 14:
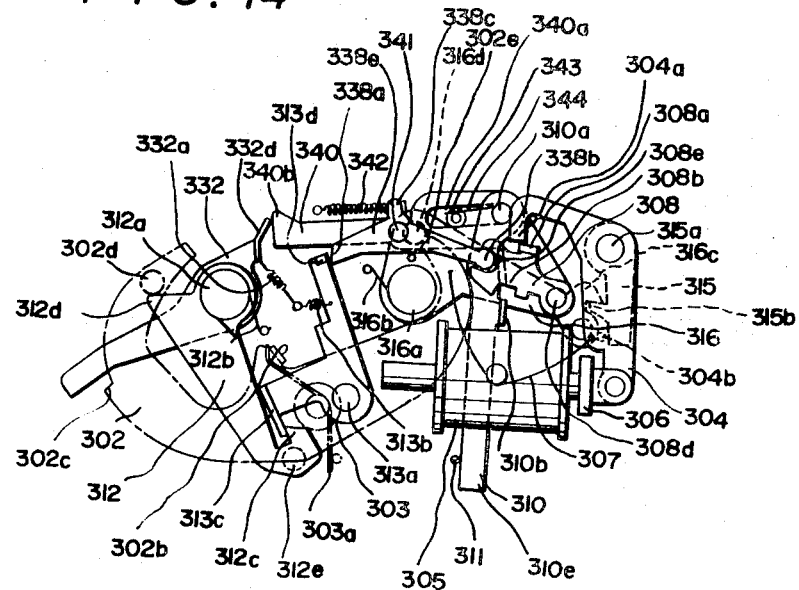

Referring now to the fifth embodiment of the present invention as shown in FIGS. 14 to 22, in which FIG. 14 of FIGS. 14 to 17 shows the shutter being in a cocked position, a control lever 302 is rotatably journaled on a shaft 303 and tends to rotate in a clockwise direction by means of a spring 303a, and has a left arm pin 302d and a notch 302c, pin 302d being adapted to rotate lever 202 against the aforesaid spring action in a counterclockwise direction, thereby engaging a shutter-opening driving lever 312, and notch 302c being adapted to engage a releasing lever (not shown) with the shutter cocked on its end face 302e which urges the shutter-closing lever 17, the lever 302 further having an uprising portion 302b adapted to engage the shutter forward curtain arresting lever 313, when the notch is released.

An electromagnetic actuated lever 304, having at one end an armature 306 adapted to be attracted by means of the rear curtain control electromagnet 305, is journaled on a shaft 315a, and a spring 307 is mounted between control lever 302 and lever 304, one arm of which is provided with an actuating pin 304b adapted to engage the rear curtain arresting lever 315 and the other arm of which is formed with an actuating arm 304a.

A forward curtain arresting lever 313, which is journaled on a shaft 313a and tends to rotate in a counterclockwise direction by means of a spring 313b and which is adapted to rotate in a clockwise direction against the bias of spring 313b by engaging member 302b when control lever 302 is released, has a projection 313d at one end of an arm and another projection 313c on the other arm. A forward curtain driving lever 312, which has on its one arm a hook portion 312c adapted to engage or disengage projection 313c and a pin 312e, is journaled on a shaft 312a and tends to rotate in a clockwise direction by means of a spring 312b, thereby releasing the forward curtain. An operating lever 332, which is also journaled on shaft 312a and which is adapted to be driven in a clockwise direction by engaging pin 312e in the clockwise rotating course of the forward curtain driving lever 312, tends to rotate in a clockwise direction by means of a weak spring 332a, with an operating projection 332d, formed on its one end, being in abutting relation to one end face 340b of a shifting member 340.

The shifting member 340 is provided with a guide groove 340a proximate its end but projecting therefrom, groove 304a loosely receiving a guide pin 343 and a stop lever 310 which will be hereinafter described to thereby confine the lateral movement of shifting member 340. Rotatably journaled on a shaft which is mounted on shifting member 340 in a projecting relation therefrom is an engagement auxiliary lever 338. A projection 313d of the forward curtain arresting lever is adapted to abut one end face 338a of auxiliary lever 338 in the rotating course of projection 313d, while the circular projection 338c on the other end abuts the engagement lever 308. On the other hand, there is mounted a spring 342 between the projection 338c and the camera body to thereby cause the auxiliary lever 338 to rotate in a counterclockwise direction, while pulling the shifting member 340 to the left by means of a shaft 341. Furthermore, an engagement lever 308, which is rotatably journaled on shifting member 340 by means of a shaft 308d, has on its tip a yoke portion in which is normally fitted a circular projection 338b of said auxiliary lever 338, a projection 308a engageable with manipulating arm 304a of lever 304 and a notch portion 308b constituting a clutch portion for engagement with the stop lever 310, which will be described hereinafter.

A rear curtain arresting lever 315 which is rotatably journaled on shaft 315a of the electromagnetic lever 304, engages pin 304b in abutting relation thereto by means of a weak spring (not shown), and includes an arresting projection 315b.

A rear curtain driving lever 316, which tends to rotate in a clockwise direction by means of a spring 316b and which is rotatably journaled on a shaft 316a, has on its tip a fork portion 316c engageable with arresting projection 315b, and a pin 316d engageable with the end face 302e of the control lever 302, and, furthermore, lever 316 rotates in a counterclockwise direction against the action of spring 316b to a position shown in FIG. 14 by means of said engagement. The fork portion 316c of lever 315 at the cocked position engages the arresting projection 315b so as to be arrested, and when the rear curtain driving lever 316 rotates in a clockwise direction by releasing said engagement, the shutter rear curtain is caused to travel.

A stop lever 310, which is adapted to stop the return operation of the reflex mirror that is rotatably journaled on shaft 310a and tends thereby to rotate in a clockwise direction, is provided with a porjection 310b engageable with the notch portion 308b of engagement lever 308 and with an operating end 310c, lever 310 normally abutting the stopper 311 being urged by the spring action.

Figure 18:
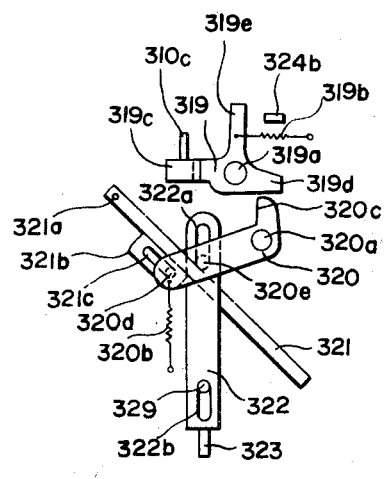
Figure 20:
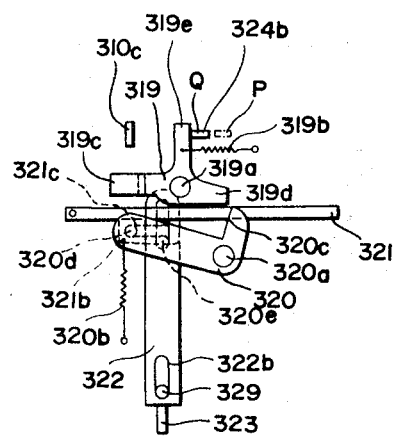

As seen in FIGS. 18 and 20, the operating end 310c of the stop member 310, adapted to stop the return operation of the reflex mirror, is journaled on a shaft 319a to engage an arm 319c of a reflex mirror arresting lever 319 which tends to rotate in a clockwise direction by means of a spring 319b. Thus, when stop lever 310 abuts the stopper 311, stop lever 310 rotates the reflex mirror arresting lever 319 in a counterclockwise direction against the spring action of the spring 319b, as shown in FIG. 18. The reflex mirror arresting lever 319 is provided with an arresting edge 319d and a projection 319e.

A movable reflex mirror 321 is journaled on a shaft 321a in a rotatable manner relative to the camera body, on the rear side of which is located an operating frame 321b having an elongated slot 321c in parallel to the mirror plane.

Slidably engaging elongated slot 321c is a pin 320d of the reflex mirror arresting auxiliary member 320 which tends to rotate in a counterclockwise direction by means of a spring 320b and which is rotatably journaled on a shaft 320a. Another pin 320e is positioned on the reflex mirror arresting auxiliary member 320, while an engaging face 320c engageable with arresting edge 319d is located on its arm end, pin 320e engaging an elongated slot 322b in intermediate member 322 which is movable in a vertical direction relative to the camera body by means of the reflex mirror driving member 323. Shown at 324b is an operating end of a switching lever 324, assuming a position Q where it engages the projection 319e of said reflex mirror arresting lever 319 and a position P where it is retracted therefrom.

Figure 19:
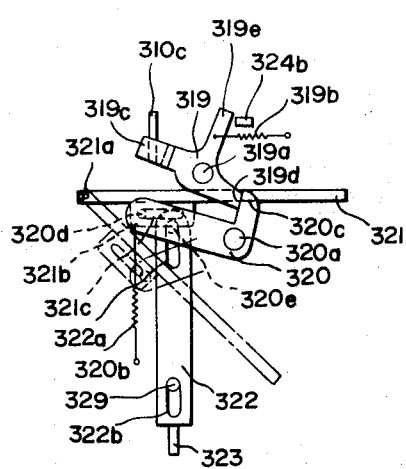
Figure 21:
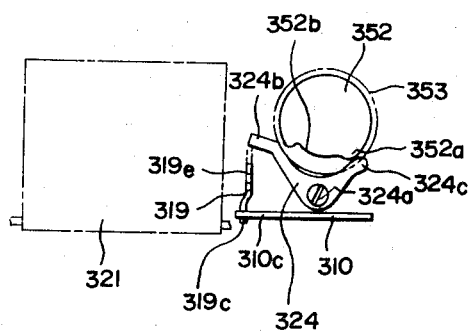
Figure 22:
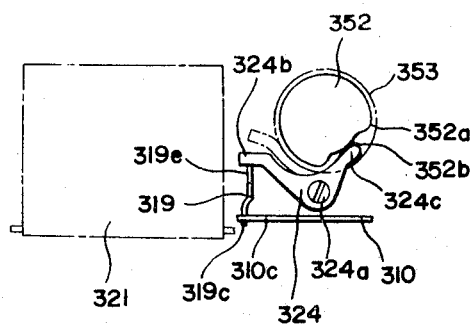

As shown in FIGS. 21 and 22, a dial 353, as a shutter setting dial, switches upon its rotation, the setting of the manual exposure duration by means of the electrically controlled automatic exposure control and, in addition, the setting of the exposure duration at a given speed due to the mechanical control. Fixedly and coaxially mounted on said dial 353 is a cam plate 352 which is formed with a large diameter portion 352a corresponding to the case of the control of the electric shutter plus a small diameter portion 352b corresponding to the case of the mechanical control of the shutter. A follower arm 324c of a switching lever 324 rotatably journaled on a shaft 324a, tends to engage said cam plate 352, while the operating end 324b is adapted to engage the projection 319e of the reflex mirror arresting lever 319, as has been described. In the case of the electrical control of the shutter, the operating end 324b of switching lever 324 assumes a position P retracted from the projection 319e as shown in FIG. 21 in a manner as shown in FIGS. 18 and 19, while in the mechanical control of the shutter, the operating end 324b of the switching lever 324 assumes the position Q engaging the projection 319e by means of the small diameter portion, thereby stopping the rotation of the reflex mirror arresting lever 319 as shown in FIG. 20.

Considering the operation of the last embodiment, when the shutter is selected so as to be electrically controlled and the electromagnet 305 operates normally to attract the armature 306v, as shown in FIG. 21, the operating end 324b of the switching lever 324 assumes a position retracted from the projection 319e of the reflex mirror arresting lever 319 as effected by means of the shutter speed dial 353.

When the control lever 302 rotates in a counterclockwise direction, the pin 302d urges the shoulder portion 312d of the forward curtain driving lever 312, while the end face 302e urges the pin 316d of the rear curtain driving lever 316, whereby both driving levers 312 and 316 rotate in a counterclockwise direction such that the forward curtain driving lever 312 engages the projection 313c of the forward curtain arresting lever 313, while the rear curtain driving lever 316 engages the arresting projection 315b of the rear curtain arresting lever 315, respectively. Furthermore, the control lever 302 is arrested with the notch 302c engaging the releasing member (not shown) to thereby bring the shutter of FIG. 14 in a cocked position. Due to the counterclockwise rotation of the control lever 302, the spring 307 causes the lever 304 to tend to rotate in a counterclockwise direction, thus causing the armature 306 to abut the electromagnet 305, while the shifting member 340 is pulled to the left by means of the spring 342, such that the arm 304a of the lever 304 faces the projection 308a of the engagement member 308 in an engageable relation.

With this condition, when the shutter releasing operation is effected, the control member 302 is released from being arrested and thus begins to rotate in a clockwise direction, while closing switch $S_1$ and switch $S_3$, thus energizing the electrical control circuit. This excites the electromagnet 305 to attract the armature 306 in the contacting position as described, while maintaining the lever 304 in its retracted position, and the spring is thereby energized.

Subsequently, the portion 302b of the control lever 302 abuts the forward curtain arresting lever 13, whereby the lever 313 is rotated in a clockwise direction against the action of the spring 313b, such that the projection 313d thereof abuts the end face 338a of the engagement auxiliary lever 338 to thereby move the same to the right, coupled with the shifting member 340, against the spring action of the spring 342, whereby projection 308a is retracted to the right from the rotational path of the arm 304a.

Figure 15:
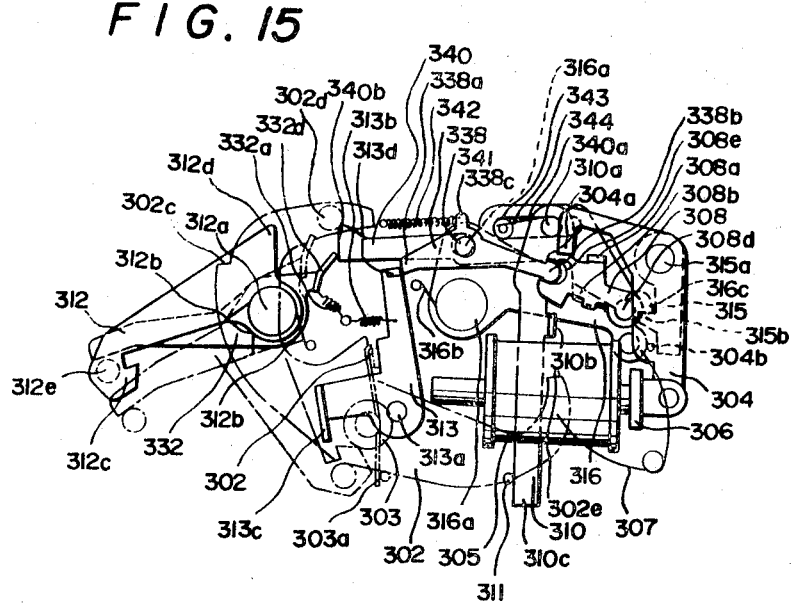

On the other hand, the projection 313c of the forward curtain arresting lever 313 is disengaged from the hook portion 312c of the forward curtain driving lever 312, whereupon the forward curtain driving lever 312 begins to rotate under the action of the spring 312b in a clockwise direction to thereby permit the exposure as shown in FIG. 15, while opening the trigger switch $S_4$ of the electric control circuit, thus commencing the charging to the capacitor $C_2$. After a predetermined period of time, when the capacitor $C_2$ reaches a given level, the electromagnet 305 is demagnetized, such that the lever 304 rotates in a counterclockwise direction. However, as has been described, the projection 308a of the engagement member 308 is retracted from the arm 304a without the resultant engagement, and thus engagement lever 308 will not rotate, so the notch portion 308b thereof does not engage the projection 310b of the stop lever 310, maintaining the stop lever 310 still, while the operating end 310c holds the arm 319c of the reflex mirror arresting lever 319, thereby stopping the rotation of the arresting lever 319, and the intermediate member 322 is urged upwardly due to the known reflex mirror driving mechanism moving upwardly, before commencement of the exposure. Accordingly, even if the reflex mirror arresting auxiliary member 320 engaging the groove 322a by means of the pin 320, as shown in FIG. 19, rotates in a clockwise direction in connection to the rotation of movable reflex mirror 321 toward the picture taking position, the engaging face 320c does not engage the arresting edge 319d.

On the other hand, the counterclockwise direction of the electromagnetic lever 304 causes the pin 304b to rotate the rear curtain arresting lever 315 in a counterclockwise direction, such that the arresting projection 315b is disengaged from the fork portion 316c of the rear curtain driving lever 316 and, as a result, the rear curtain driving lever 316 rotates by means of the spring 316b in a clockwise direction to drive the rear curtain, thereby completing the exposure. Upon completion of the exposure, the movable reflex mirror 321 returns to the viewing position by means of the spring 320b with the aid of a known quick-return mechanism or in connection to the completion of the releasing operation.

Figure 16:
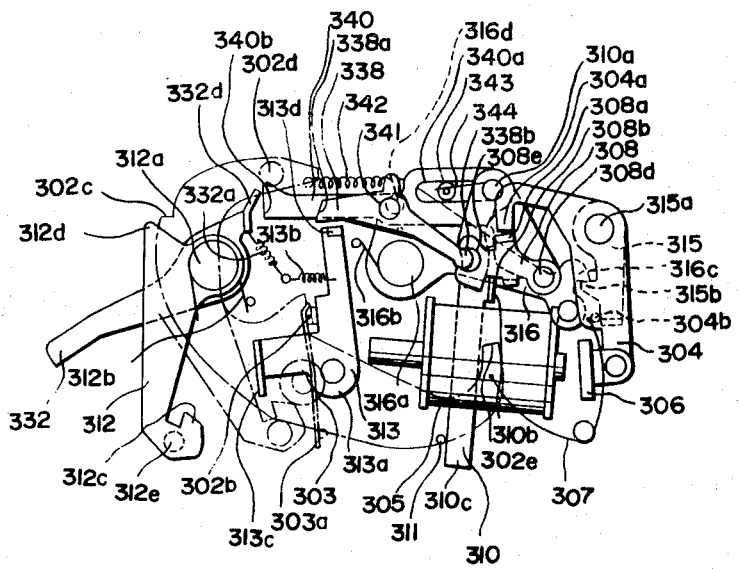
Figure 17:
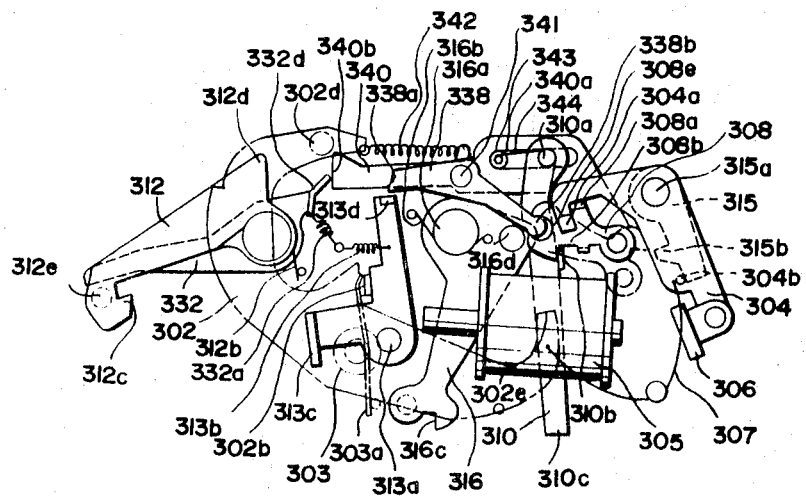

Considering now the case where the shutter is selected so as to be controlled electrically and the electric control means is in the abnormal condition and thereby the electromagnet 305 does not operate normally, failing to attract the armature 306, with the shutter as shown in FIG. 14, being in a cocked position, the control lever 302 rotates in a clockwise direction by means of the releasing operation with the electric control circuit closed, whereas the electromagnet 305 is not normally excited. Accordingly, the lever 304 immediately rotates by means of the spring 307, whereupon the manipulating arm 304a, which has been facing the projection 308a, engages and urges the same, such that the engagement lever 308 rotates in a counterclockwise direction and the notch portion 308b engages the projection 310b of the stop lever 310, as shown in FIG. 16. At this time, the pin 304b somewhat rotates the rear curtain arresting lever 315 in a counterclockwise direction, whereas the rotation of the lever 304 is limited due to the engagement of the projection 310b with notch 308b, so the arresting projection 315b is maintained in engagement with the fork portion 316c of the rear curtain driving lever 316, holding the rear curtain driving lever 316. The slight counterclockwise rotation of the engagement lever 308 rotates the engagement lever 338 in a clockwise direction, and the end face 338a thereof is retracted from the rotational path of the projection 313d of the forward curtain arresting lever 313. Thus, as has been described, even if the forward curtain arresting lever 313 rotates in a clockwise direction by means of the control lever 302, the shifting member 340 is maintained in a position as shown in FIG. 14. On the other hand, the forward curtain driving member 312, which has been released from the arrested position through the clockwise rotation of the forward curtain arresting lever 313, rotates in a clockwise direction, while opening the shutter, and engages the operating lever 332 in the course of rotation, while rotating therewith in a clockwise direction, then abutting and engaging the end face 340b of the shifting member 340, and eventually moving the shifting member 340 to the right against the action of the spring 342. As a result, the engagement lever 308 moves to the right, such that the notch 308b rotates the stop lever 310 in a counterclockwise direction, while the projection 308a shifts to the right from a position abutting arm 304a as shown in FIG. 16 to a position as shown in FIG. 17. Accordingly, the lever 304 rotates in a counterclockwise direction by means of the spring 307, while the pin 304b urges the rear curtain arresting lever 315 in a counterclockwise direction, thereby disengaging the arresting projection 315b from the rear curtain driving lever 316, and the rear curtain driving lever 316 rotates in a clockwise direction by means of the spring 316, completing the exposure. The time interval between arresting and releasing of the forward and rear driving levers 312 and 316 sets a single shutter speed exposure by means of the mechanical mechanism.

Prior to this, rotation of the stop lever 310 permits the clockwise rotation of the arresting lever 319 by means of the spring 319b, as shown in FIG. 19 to thereby engage the arresting edge 319d thereof with the engaging face 320c of the reflex mirror arresting auxiliary member 320 which rotates in a clockwise direction, thus holding the arresting auxiliary member 320 in the rotating position. Thus, the pin 320e stops the descending movement of the intermediate member 322 to thereby hold the movable reflex mirror 321 in the picture taking position, while maintaining the movable reflex mirror 321 in the picture taking position, even after the completion of the releasing operation, thus indicating that the electromagnet 305 is not normally excited.

The case where the shutter operation is selected so as to be controlled mechanically can be said to be the case where the electric control is switched to the mechanical control with the advanced knowledge of the normal excitation of the electromagnet or the case where the mechanical control is performed due to the preselection of the photographer, even if the electromagnet 305 operates normally. Accordingly, an alarm may not be given, while stopping the return operation of the reflex mirror. In other words, the photographer sets in advance the shutter speed dial 353 as shown in FIG. 22. Due to the aforesaid operation, the main switch is maintained in the open position, so the electric control is not performed.

In this case, the operating end 324b of the switching lever 324 as shown in the drawings assumes the position Q in FIG. 20, thereby holding the projection 319a of the arresting lever 319 against the spring 319b. On the other hand, as to the shutter mechanism, since the electric control circuit is open, the electric control circuit does not operate, even if the control lever is driven by means of the releasing operation, such that the electromagnet 305 is not excited normally. Accordingly, in the same manner as has been earlier described, a single shutter speed exposure control may be effected. At this time, stop lever 310 rotates in a counterclockwise direction, while the operating end 310c thereof releases the arresting lever 319. However, since the projection 319e is held by means of the operating end 324b of the switching lever 324, the arresting lever 319 does not rotate in a clockwise direction and, furthermore, the arresting edge 319d will not be in engagement with the engaging face 320c of the arresting auxiliary member 320, so the movable reflex mirror 321 returns to the viewing position, simultaneously with the completion of the exposure.

The above description is merely illustrative of preferred embodiments of the present invention and many additional modifications and alterations utilizing the present invention are obvious to those skilled in the art. However, the gist of the invention can be summarized as follows: when the electric control of the camera is brought into abnormal condition, thereby failing to perform exposure control, a member, which is adapted to be shifted by means of electric control means adapted to control releasing operation and the exposure, detects the aforesaid abnormal condition to thereby hold and arrest the movable reflex mirror in its picture taking position, thus indicating the abnormal condition within the finder, without bringing the winding mechanism and shutter releasing mechanism in the abnormal condition, whereby the movable reflex mirror is restored to the viewing position rather than to the picture taking position, to which said mirror is to be brought by means of winding operation, thus enabling the subsequent photographing. Accordingly, the modification and improvement made in line with the aforesaid principle may be fairly presumed to be within the scope and purview of the present invention as defined by the claims that follow.

What is claimed is:

1. A single lens reflex camera comprising a mirror movable between an advanced viewing position and a retracted photographing position, a shutter, means responsive to the release of said shutter for retracting said mirror and for advancing said mirror, electrical means for automatically controlling an exposure parameter of said camera, and means responsive to an inoperable condition of said electrical means for releasably locking said mirror in its retracted position.

2. The camera of claim 1, wherein said electrical means includes an electromagnet, a voltage source and means for connecting said electromagnet with the release of said shutter to its open condition and for disconnecting said electromagnet from said voltage source following an exposure interval, and said locking means comprises an armature associated with said electromagnet and movable between an advanced attracted position upon the energization of said electromagnet and a retracted position upon deenergization of said electromagnet, said shutter being retained in its open position by the advanced position of said armature, said locking means being responsive to the retracted position of said armature for locking said mirror in its retracted position.

3. The single lens reflex camera of claim 2, including means for releasing said mirror for movement to its advance position independently of the operable condition of said electrical means.

4. The single lens reflex camera of claim 1, wherein said electrical means comprises a battery and said locking means is responsive to the voltage of said battery falling below a predetermined level to releasably lock said mirror in its retracted position.

5. A single lens reflex camera comprising:
an electric automatic exposure control means adapted to determine the photographing condition;

a reflex mirror movable between a first viewing position for observing the light transmitted through an objective lens and a second picture taking position;

means for driving said reflex mirror from said first position to said second position, prior to the commencement of the operation of the shutter-opening member in connection with the releasing operation of the shutter, and for driving said reflex mirror from said second position to said first position; and means for restraining said reflex mirror from moving from said second position to said first position by said driving member responsive to said electric exposure control means failing to perform its electric exposure control.

6. A single lens reflex camera as set forth in claim 1, wherein said electric exposure control means has a single electromagnet adapted to determine the exposure rate by means of the output therefrom.

7. A single lens reflex camera as set forth in claim 1, wherein the opening member and closing member of the shutter, which are driven by means of said shutter-opening driving member and said shutter-closing driving member, consist of curtains, respectively.

8. A single lens reflex camera which is provided with an electric control means for controlling the exposure by delaying the closure of the shutter during the excitation of an electromagnet adapted to be excited attendant to the shutter releasing operation, comprising;

an operating member movable between a first position where the shutter is cocked and a second position where the shutter is released and adapted to be driven from said first position to said second position in response to the shutter releasing operation;

a driving means for opening the shutter releasable from an arrested position when said operating member shifts from said first position to said second position;

a member actuatable by the electromagnet and adapted to arrest in its cocked position a driving member for closing the shutter, when said electromagnet is magnetized and which tends to release said driving member when said electromagnet is demagnetized;

a movable reflex mirror provided with a driving member, said mirror being adapted to be movable between a viewing position and a picture taking position and normally urged to assume the viewing position while being driven from said viewing position to said picture taking position in connection with the shutter releasing operation;

a shifting member adapted to be operated by means of a member cooperable with the electromagnet and to be driven in connection with said operating member, said shifting member being movable along a first path wherein said shifting member is operated by means of a member cooperative with said electromagnet due to demagnetization of said electromagnet, after being driven in connection with said shifting of said operating member due to said electromagnet being excited, when said operating member is shifted from said first position to said second position, and along a second path wherein said shifting member is driven in connection to the shifting of said operating member, after being operated by means of a member cooperable with said electromagnet, with said electromagnet not being excited, when said operating member shifts from said first position to said second position;

means for positioning an arresting member in a second position for arresting said reflex mirror; and means for shifting to a second position the reflex mirror arresting member which is in the second position when said operating member shifts from said first position to said second position.

9. A single lens camera as set forth in claim 8, wherein said operating member is a control member which has been biased from said first position to said second position and which is adapted to be arrested in the first position, when shifted to said first position against said biasing, with said shutter-opening driving member and said shutter-closing driving member arrested in their cocked positions and which is adapted to release said shutter-opening member when shifted to said second position by being released due to the shutter-releasing operation; said shifting member engageable with said control member of shutter-opening driving member, said shifting member being adapted to move along a first path by being driven by means of a member cooperable with said electromagnet due to the demagnetization of said electromagnet, after said shifting member has been driven in engagement with said control member, but when said control member shifts from said first position to said second position and said electromagnet is then excited, said shifting member further being adapted to move along said second path by being driven in engagement with said shutter-opening driving member, after being operated by means of a member cooperable with said electromagnet, with said electromagnet not being excited, when said control member moves from said first position to said second position.

10. A single lens reflex camera as set forth in claim 9, wherein said shifting member is engageable with either one of said control member and shutter-opening driving member, by being rotated relative to the camera body by means of a member cooperative with the electromagnet, said shifting member being a lever adapted to slide relative to the camera body, when driven in engagement with said control member or said shutter-opening driving member.

11. A single lens reflex camera as set forth in claim 9, wherein said shifting member is operated by means of a member cooperable with said electromagnet in a nonexcited state when said control member shifts from said first position to said second position, while stopping said member cooperable with said electromagnet, thereby maintaining a shutter-closing driving member in an arrested condition, said shifting member being further adapted to effect the closing operation of said shutter by releasing said member from being arrested, when said shifting member is driven in engagement with said shutter-opening driving member.

12. A single lens reflex camera as set forth in claim 8, further comprising:
means for biasing an arresting member (19) in its second position, said arresting member being adapted to arrest said reflex mirror in the picture taking position;
a stop member adapted to stop said arresting member in the first position against said biasing movement; and
means for releasing said arresting member from being stopped due to said stop member.

13. A single lens reflex camera as set forth in claim 8, further comprising:
lock means manually movable between a first position permitting said arresting member to shift to the second position and second position arresting said arresting member in the first position, said arresting member being adapted to arrest said reflex mirror in the picture taking position.

14. A single lens reflex camera as set forth in claim 13, further comprising:
mechanical control means adapted to mechanically control the exposure of the shutter;
a selecting member adapted to select between said electric control means and said mechanical control means;
means for bringing said electric control means in an inoperable condition, when said selecting member selects said mechanical control means; and
means for positioning said lock means in the second position.

15. A single lens reflex camera as set forth in claim 14, further comprising:
means whereby said mechanical control controls the shutter, when said selecting member selects said electric control means and shifts along said second path when said operating member shifts from the first position to the second position.

16. A single lens reflex camera as set forth in claim 8, wherein said operating member consists of: a gear adapted to rotate from a cocked position to a rest position to thereby drive the reflex mirror from the viewing position to the picture taking position, a control cam fixedly mounted on the shaft of said gear and having a stop shoulder, and a stop member movable into the path of said shoulder in response to the unexcited state of said electromagnet.

17. A single lens reflex camera provided with the electric control means adapted to control the exposure, with the shutter being stopped from being closed, due to the electromagnet adapted to be excited through the releasing operation, comprising:
a shutter consisting of a first light shield member for commencing the exposure and a second light shield member for completing the exposure
a control member adapted to shift from the first position to the second position through the shutter releasing operation, with said shutter being biased from said first position to said second position, while being movable between said first position where said shutter is cocked and said second position where said shutter is released;
a first driving member adapted to drive said light shield member from its cocked position to its rest position;
a first arresting member adapted to shift from a first position to a second position, in engagement with said control member, said arresting member being adapted to shift from said first position where said first driving member is arrested in its cocked position and said second position where said first driving member is released;
a first shifting lever adapted to slide to a second position along a given path relative to the camera, in engagement with said first driving member in the rest position, while being biased to said first rest position;
a second shifting member adapted to drive to a second position said first shifting lever, which has been in said first position, by means of the engagement of said first arresting member which is adapted to shift from said first position to the second position according to the rotational position thereof and which is rotatably journaled on said first shifting lever;
a third shifting lever which is link connected to said second shifting lever and rotatably journaled on said first shifting lever;

a second driving member adapted to drive said second light shield member from the cocked position to the rest position;

a second arresting member movable between a first position where said second driving member is arrested in its cocked position, and a second position where said second driving member is released;

an electromagnet actuated lever adapted to engage said third shifting lever, when said first shifting lever is in said first position, said electromagnet actuated lever being adapted to drive said second arresting member from its first position to the second position in cooperation with said electromagnet;

a movable reflex mirror provided with a driving member adapted to drive the said mirror from the viewing position to the picture taking position in connection to the releasing operation, said mirror being movable between the viewing position and the picture taking position;

a third arresting member adapted to be biased to a first position, said member being movable between the picture taking position where said movable reflex mirror is arrested in the picture taking position and a second position where said mirror is released; and a stop lever which is movable between a position where said third arresting member is stopped in the second position and a second position where said member is released, said stop lever being adapted to engage said third shifting lever and stop the movement of said second arresting member toward said second position, when the third shifting lever and the electromagnetic lever are in engagement with each other, while being driven to the second position by means of said third shifting lever, when said first shifting lever shifts to the second position to thereby disengage said electromagnetic lever from the third shifting lever and thereby said second arresting member shifts to the second position.

* * * * *